Dec. 1, 1970    A. BERGENDAL ET AL    3,543,590
MECHANICAL VIBRATOR

Filed Jan. 8, 1969    2 Sheets-Sheet 1

INVENTORS
ARNE BERGENDAL &
BY   JOHNNY FRANSSON

Burroughs, Graves, Donohue & Raymond their    ATTORNEYS

# United States Patent Office 3,543,590
Patented Dec. 1, 1970

3,543,590
MECHANICAL VIBRATOR
Arne Bergendal, Stockholm, and Johnny Fransson, Akersberga, Sweden, assignors to Aktiebolaget Vibro-Verken, Solna, Sweden, a corporation of Sweden
Filed Jan. 8, 1969, Ser. No. 789,668
Claims priority, application Sweden, Jan. 9, 1968, 233/68
Int. Cl. B06b 3/00
U.S. Cl. 74—87    7 Claims

ABSTRACT OF THE DISCLOSURE

A mechanical vibrator which includes a roller path of cup-shaped cross-section and along the inside of which one or more balls are driven. The vibrator includes a drive member, mounted on a central axis, on which ball drive means are pivotally mounted. The ball drive means are formed to provide an abutment of greatest area at all times between the ball and the ball drive means while the ball is propelled by the drive member.

BACKGROUND OF THE INVENTION

This invention relates to an improved mechanical vibrator of the type which includes a ball positioned in a circular roller path and driven there along by a drive member arranged centrally relative to the roller path, thus generating vibrations. The drive member in such a vibrator is formed to permit the ball to roll freely during its movement along the roller path and yet it must prevent the ball from rolling out of the path when the drive member is stationary.

In one known vibrator of this type, the drive member is provided with a support ring which encloses the ball and acts upon the ball peripherally up to substantially half of its height. The ring is substantially parallel with the tangent to the roller path at the point at which the ball contacts the path.

In another ball vibrator, the end of the drive member includes two plates one of which is behind the ball in its path of movement and the other is in front of the ball. The plates are mounted on the drive member in fork or stirrup-like holders.

A disadvantage of these vibration generating arrangements is that the ball abuts the drive ring and drive plates at only one point. Consequently, the surface pressure is unduly great which leads to high rates of wear and excessive heat generation.

Attempts have been made to obtain an increased abutment area between the ball and drive member by designing the drive member in the form of a bowl. However, because of manufacturing tolerances and high heat generation in the drive shaft of the drive member, caused by load stresses in the shaft bearings, and subsequent linear expansion of the shaft, it is not always possible to provide coincident radial planes through the axis of rotation of the drive member and through the center of the roller path. Consequently, complete contact between ball and drive member is not obtained.

SUMMARY OF THE INVENTION

The foregoing and other disadvantages of known ball-type mechanical vibrators are overcome by a vibrator according to the invention which includes a drive member adapted to be rotated about a central axis and ball drive means mounted on the drive member for pivotal movement around an axis radially directed from the central axis. The drive means propels one or more balls in a circular roller path to thereby produce vibrations. Because the ball drive means can pivot, an abutment of maximum area is provided between the ball and the ball drive means.

BRIEF DESCRIPTION OF THE DRAWINGS

For a better understanding of the invention, reference may be made to the following detailed description of exemplary embodiments, and to the drawings, in which.

DETAILED DESCRIPTION OF THE INVENTION

Figure 1:
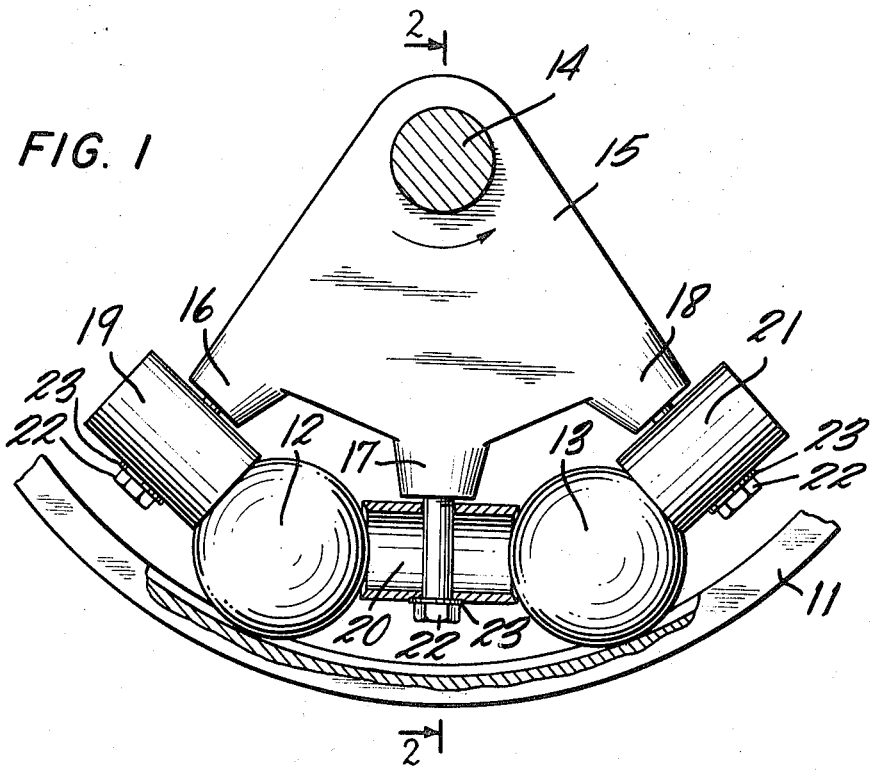
FIG. 1 is an elevational view of a mechanical vibrator in accordance with the invention.
Figure 2:
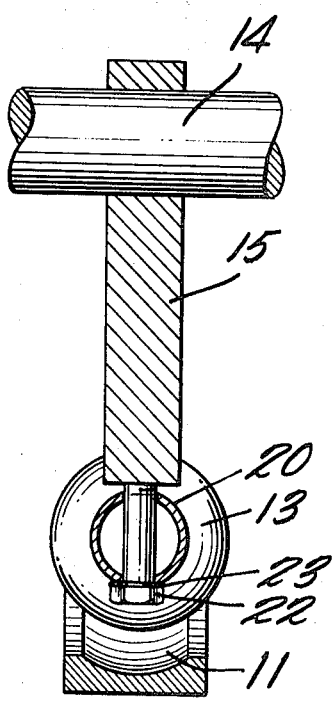
FIG. 2 is a cross-sectional view taken on line 2—2 of FIG. 1.

FIGS. 1 and 2 illustrate a mechanical vibrator according to the invention which includes a roller path 11 of cup or bowl-shaped cross-sectional configuration. Balls 12 and 13, positioned in the roller path, generate vibrations when driven along the inside of the path.

The vibrator is operated by a drive shaft 14, which is on the central axis of the roller path 11. A drive member 15, coupled to the drive shaft 14, extends toward the roller path. The drive member 15 is provided at its outer end with three arms 16, 17 and 18, on each of which is pivotally mounted a ball drive means 19, 20 and 21 which may be tubular in form as shown in FIGS. 1 and 2. A pivot pin 22, radially directed from the central axis of rotation of the drive member, attaches each ball drive means to its corresponding arm in a manner such that the ball drive means can swivel around the pin, as shown in the cut-away view of the ball drive means 20 in FIG. 1.

The balls 12 and 13, respectively, are positioned between the ball drive means 19 and 20 and 21, respectively. As seen from the cut-away view, the ball drive means 20 embraces a portion of the ball 13 to provide an annular abutment between the end portions of the ball drive means and the ball. By suitably adjusting the diameter of the tubular ball drive means to the diameter of the ball, an annular abutment of desired magnitude is obtained, as opposed to the far smaller spot-like abutments of prior vibrators. The annular abutment surface can be further increased in area by chamfering the end portions of the ball drive means.

When used in a tubular form, the ball drive means also may function as reservoirs for the lubricant used to lubricate the ball and the roller path, and the abutment surface between the ball and the ball drive means. A further advantage afforded by the tubular ball drive means is a substantial reduction in manufacturing cost since mass production only requires the cutting of long lengths of stock into smaller size pieces suitable for the ball drive means.

If it is assumed that the drive member 15 moves in a counterclockwise direction, as indicated in FIG. 1, the balls 12 and 13 are moved along the roller path 11 by ball drive means 19 and 20, respectively. The abutment pressure on the drive side between the ball and the ball drive means results in pivoting of the ball drive means and full abutment between those elements. The distance between the ball and the ball drive means is adjusted so that there is contact only on the drive side even if the drive means 20 swivels to the maximum limit theoretically possible as it abuts the ball 13. When the vibrator is slowed, the drive member decelerates and the conditions are the same as if the drive member were to rotate clockwise.

Because of manufacturing tolerances or the generation of heat in the shaft 14 as a result of high stresses in the bearings, the radial plane through the central axis of the ball drive means does not always coincide with the radial plane through the center of the roller path 11. However, the present invention overcomes this problem by the pivoting ability of the drive means which centers it to provide for full abutment between the ball and the drive means.

To prevent the ball drive means from being thrown out against the roller path 11 as a result of centrifugal forces acting upon the drive means during rotation of the drive member, the pivot pin 22 is provided at its outer end with reaction plate 23. As a result of such centrifugal forces, a certain moment of force is required to overcome the friction between the ball drive means and the reaction plate and to swivel and center the ball drive means on the ball. This centering moment on the drive means is exerted by the ball as it is propelled by the drive means.

To insure that the centering moment is able to overcome the friction force, the ball drive means is designed to have a relatively small mass. Moreover, it is shaped so that its abutment end portions, which cooperate with the ball, are positioned on both sides of and at a sufficient distance from the radial plane through the central axis of rotation of the ball drive means to enable the moment around the axis of rotation caused by the pressure of abutment of the ball against the end portions to outweigh the moment around the pivot axis necessary to overcome the friction force.

If the radial planes through the central axis and through the center of the roller path deviate to a wide extent, there is a risk that, as a result of the crookedness of the ball drive means caused by its pivoting action, the rear end of the ball drive means will clamp the ball situated behind it. However, this can be avoided by making the distance between the arms 16, 17 and 18 sufficiently great or by shortening the ball drive means axially.

Figure 3:
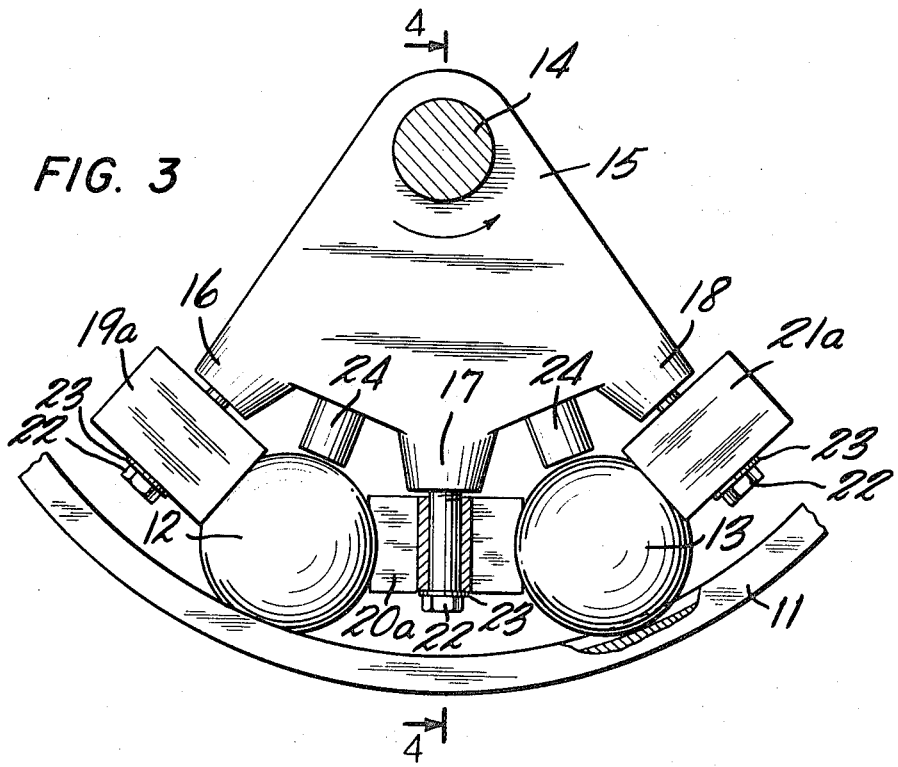
FIG. 3 is an elevational view of an alternative embodiment of a mechanical vibrator in accordance with the invention.
Figure 4:
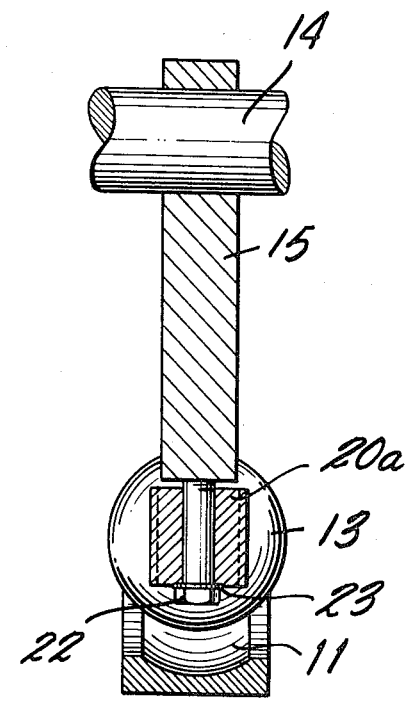
FIG. 4 is a cross-sectional view taken on line 4—4 of FIG. 3.

FIGS. 3 and 4 depict another embodiment of the invention in which the end portions of ball drive means 19a, 20a and 21a are in the shape of a yoke or stirrup. Spacer elements 24 have also been added to hold the balls in proper position when at rest. The abutment area between the ball and the ball drive means is less here, but the mass of these elements is also less and thus a sufficiently great centering moment to swivel the ball drive means may be more easily realized.

The embodiments of the invention described herein are illustrative only. Variations and modifications may be made by one skilled in the art without departing from the spirit and the scope of the invention. For example, more balls may be used than are shown in the figures. It is also possible to use only one ball, in which case the ball drive means in front of that ball, seen in the direction of movement, may be replaced by a plate or the like. Furthermore, the ball drive means may be provided with cup-shaped end portions. All such variations and modifications, therefore, are intended to be included within the scope of the appended claims.

We claim:
1. A mechanical vibrator comprising:
 a circular roller path of cup-shaped cross-section;
 at least one ball adapted to roll along the roller path;
 a drive member adapted to be rotated about a central axis;
 ball drive means having end portions adapted to abut the ball;
 means for mounting the ball drive means on the drive member with its end portion abutting the ball; and
 said mounting means facilitating pivotal motion of the ball drive means around an axis radially directed from the central axis so that the ball drive means is centered against the ball during operation of the vibrator.

2. A mechanical vibrator in accordance with claim 1, in which the ball drive means are tubular.

3. A mechanical vibrator in accordance with claim 2, in which the end portions of the ball drive means are chamfered to provide a greater area of abutment with the ball.

4. A mechanical vibrator in accordance with claim 1, in which the end portions of the ball drive means cooperating with the ball are stirrup-shaped.

5. A mechanical vibrator in accordance with claim 1, in which the peripheral distance between a pair of the ball drive means on the drive member is so adjusted relative to the diameter of the ball that contact between the ball and the ball drive means is obtained only on the drive side of the ball drive means when the drive member is rotating.

6. A mechanical vibrator in accordance with claim 1, further comprising:
 two arms attached to the drive member;
 the ball drive means attached to each arm; and
 the ball disposed between the two ball drive means.

7. A mechanical vibrator in accordance with claim 1, further comprising:
 three or more arms attached to the drive member;
 the ball drive means attached to each arm; and
 the balls disposed between each pair of the ball drive means.

References Cited
UNITED STATES PATENTS

| | | | |
|---|---|---|---|
| 1,719,123 | 7/1929 | Mitchell | 74—87 |
| 2,829,529 | 4/1958 | Fleming | 74—87 |

MILTON KAUFMAN, Primary Examiner

U.S. Cl. X.R.

173—49; 209—366.5; 259—1